United States Patent [19]

Johnson et al.

[11] Patent Number: 5,802,924
[45] Date of Patent: Sep. 8, 1998

[54] SHROUD FOR A VEHICLE STEERING COLUMN

[75] Inventors: James R. Johnson; Gary L. Dies; Mark A. Cartwright, all of Lafayette; Jonathan A. Lewis, Kokomo, all of Ind.

[73] Assignee: TRW Inc., Lyndhurst, Ohio

[21] Appl. No.: 679,289

[22] Filed: Jul. 12, 1996

[51] Int. Cl.[6] .................................................. G05G 11/00
[52] U.S. Cl. .............................. 74/484 R; 74/493; 403/3
[58] Field of Search ................... 74/484 R, 493, 74/495; 280/279; 403/3, 4

[56] References Cited

U.S. PATENT DOCUMENTS

| | | | |
|---|---|---|---|
| 2,641,939 | 6/1953 | McKee | 74/484 |
| 2,871,717 | 2/1959 | Gerstner | 74/484 R |
| 3,446,391 | 5/1969 | Yates, Jr. . | |
| 4,429,588 | 2/1984 | Emundts et al. . | |
| 4,481,838 | 11/1984 | Findley et al. . | |
| 4,649,768 | 3/1987 | Kusaka et al. | 74/484 R |
| 4,881,621 | 11/1989 | Ishida | 403/4 |
| 4,976,167 | 12/1990 | Venable et al. . | |
| 5,189,766 | 3/1993 | Weber | 403/4 |
| 5,285,695 | 2/1994 | Di Giusto | 74/484 R |
| 5,363,716 | 11/1994 | Budzik, Jr. et al. . | |

Primary Examiner—Charles A. Marmor
Assistant Examiner—David M. Fenstermacher
Attorney, Agent, or Firm—Tarolli, Sundheim, Covell, Tummino & Szabo

[57] ABSTRACT

A shroud for surrounding an upper end of a vehicle steering column includes first and second portions. The first portion defines a first opening through which the steering column extends. The second portion at least in part defines a second opening through which a turn signal actuator mounted on the steering column extends. The second portion can be mounted in different positions relative to the first portion depending on the position of the turn signal actuator relative to the steering column. The second portion at least partially closes the first opening defined by the first portion when the second portion is in the different positions. The second portion has a third opening through which the steering column extends.

20 Claims, 4 Drawing Sheets

5,802,924

SHROUD FOR A VEHICLE STEERING COLUMN

BACKGROUND OF THE INVENTION

The present invention relates to a shroud for surrounding an upper end of a vehicle steering column.

A steering column includes tilt and telescope locking mechanisms protruding from one side of the steering column. In most applications, the steering column is installed so that the tilt and telescope locking mechanisms extend from the steering column toward a driver. In some applications, the clearance between the steering column mounting and the dashboard is sufficient to allow the locking mechanisms to fit between the steering column and a dashboard. One shroud is used to cover the steering column when the steering column is mounted with the tilt and telescope locking mechanisms facing the driver and a different shroud is used to cover the steering column when the locking mechanisms face away from the driver. Accordingly, two different shrouds are designed for the same steering column.

SUMMARY OF THE INVENTION

A shroud for surrounding an upper end of a vehicle steering column includes first and second portions. The first portion defines a first opening through which the steering column extends. The second portion, at least in part, defines a second opening through which a turn signal actuator mounted on the steering column extends. The second portion includes means for enabling the second portion to be mounted in different positions relative to the first portion depending upon the position of the turn signal actuator relative to the steering column. The second portion at least partially closes the first opening defined by the first portion when the second portion is in the different positions. The second portion has a third opening through which the steering column extends.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF THE PREFERRED EMBODIMENT

Figure 1:
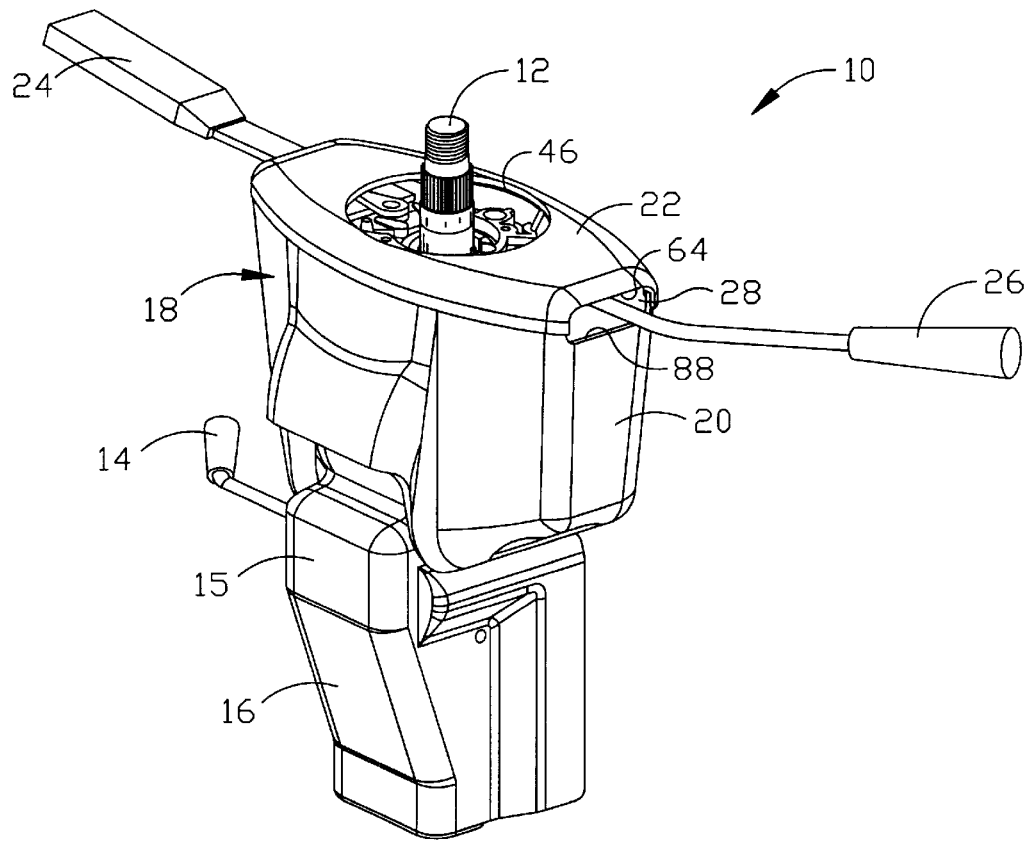
FIG. 1 is a pictorial view of a steering column with a shroud of the present invention.

An axially and angularly adjustable vehicle steering column 10 (FIG. 1) has an input shaft 12 connectable with a steering wheel. The input shaft 12 is pivotable relative to the steering column 10 and axially movable relative to the steering column, as is well known in the art. A control lever 14 controls a telescope locking mechanism and a tilt locking mechanism for locking the input shaft 12 in position. When the control lever 14 is moved in one direction, the steering column 10 can be telescoped to increase or decrease the length of the steering column. When the control lever 14 is moved in a second direction, the input shaft 12 can be pivoted relative to the steering column 10. A portion 15 of a lower shroud 16 surrounds the telescope and tilt locking mechanisms.

An upper shroud 18 surrounds an upper end portion of the steering column 10 that supports the input shaft 12 for rotation about an axis of the input shaft. The upper shroud 18 includes a first lower portion 20 located adjacent to the lower shroud 16 and a second upper portion or shroud cap 22 connected to the lower portion 20. A turn signal actuator 24 is connected to the steering column 10 and extends through an opening defined by the lower portion 20 and the shroud cap 22. An air brake valve actuator 26 of an air brake valve (not shown) connected to the steering column 10 extends through an opening 28 defined by the lower portion 20 and the shroud cap 22.

Figure 2:
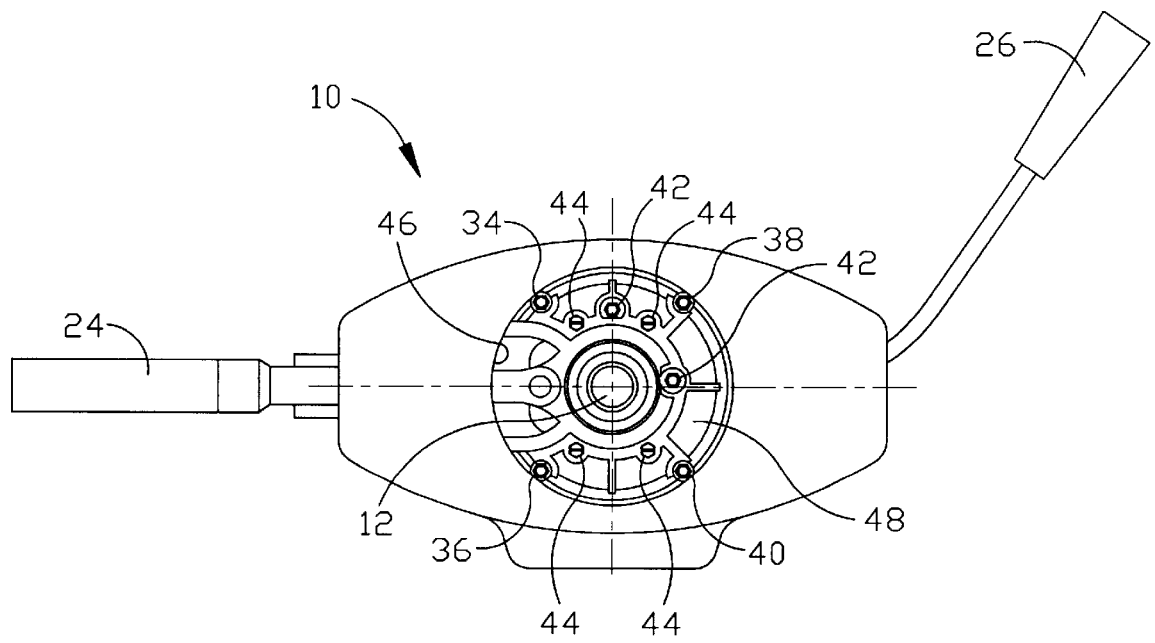
FIG. 2 is a top view of the steering column of FIG. 1.

The turn signal actuator 24 is connected to the steering column 10 by bolts 34 and 36 (FIG. 2). The air brake valve is connected to the steering column by bolts 38 and 40. A pair of bolts 42 define horn contacts for a horn switch (not shown) connected to the steering column 10. Screws 44, bolts 34 and 36 that connect the turn signal actuator 24 to the steering column 10, and bolts 38 and 40 that connect the air brake valve to the steering column connect the shroud cap 22 and, therefore, the upper shroud 18 to the steering column. Accordingly, the upper shroud 18 is pivotable with the input shaft 12 relative to the steering column 10.

The shroud cap 22 has an opening 46 through which the input shaft 12 extends. The shroud cap 22 includes a flange 48 (FIGS. 3 and 4) with openings 50 for receiving the bolts 34 and 36. The flange 48 has openings 52 for receiving the bolts 38 and 40. The screws 42 extend through openings 54 in the flange 48. Openings 56 in the flange 48 receive the bolts 44 defining the horn contacts.

Figure 3:
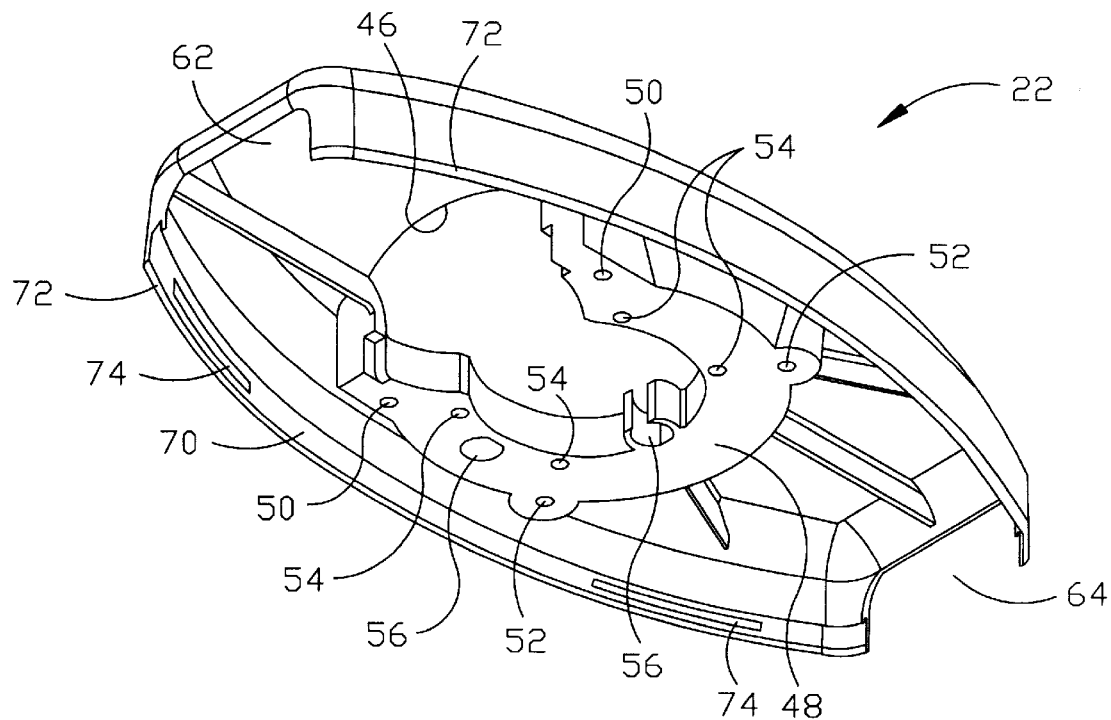
FIG. 3 is a pictorial view of a shroud cap of the shroud of FIG. 1.
Figure 4:
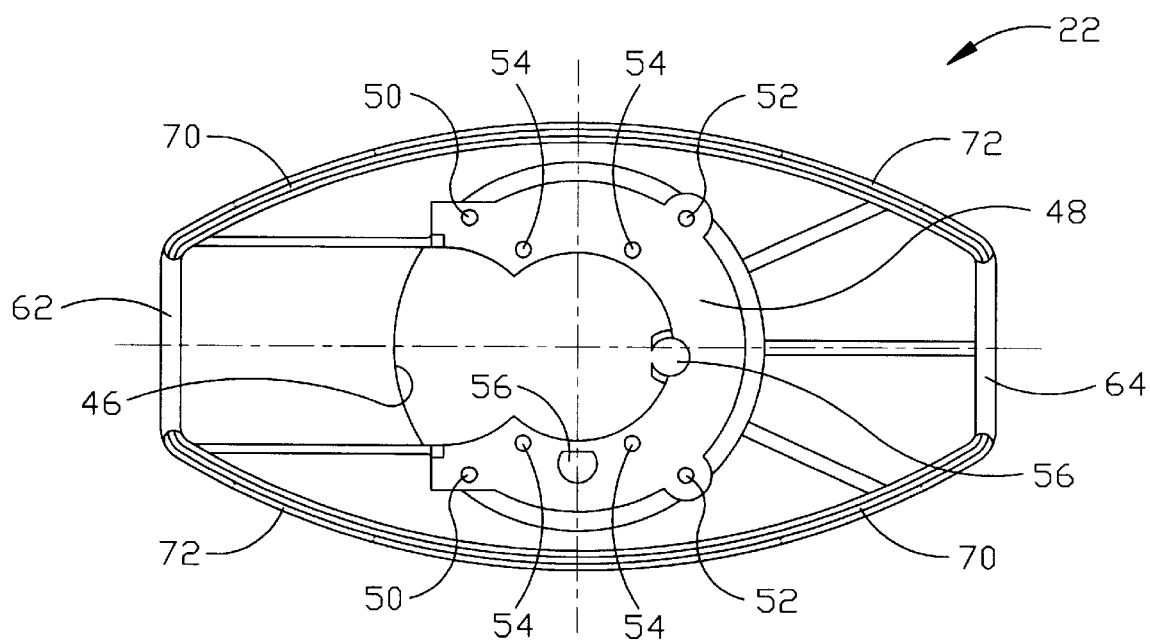
FIG. 4 is a bottom view of the shroud cap of FIG. 3.

The shroud cap 22 includes a recess 62 through which the turn signal actuator 24 extends. The shroud cap 22 includes a recess 64 located on an opposite side from the recess 62 through which the air brake valve actuator 26 extends. A pair of grooves 70 extend along the periphery of the shroud cap 22 and between the recesses 62 and 64. Outer walls 72, which define the grooves 70, include recesses 74, two of which are shown in FIG. 3. Preferably, each wall 72 includes two recesses.

Figure 5:
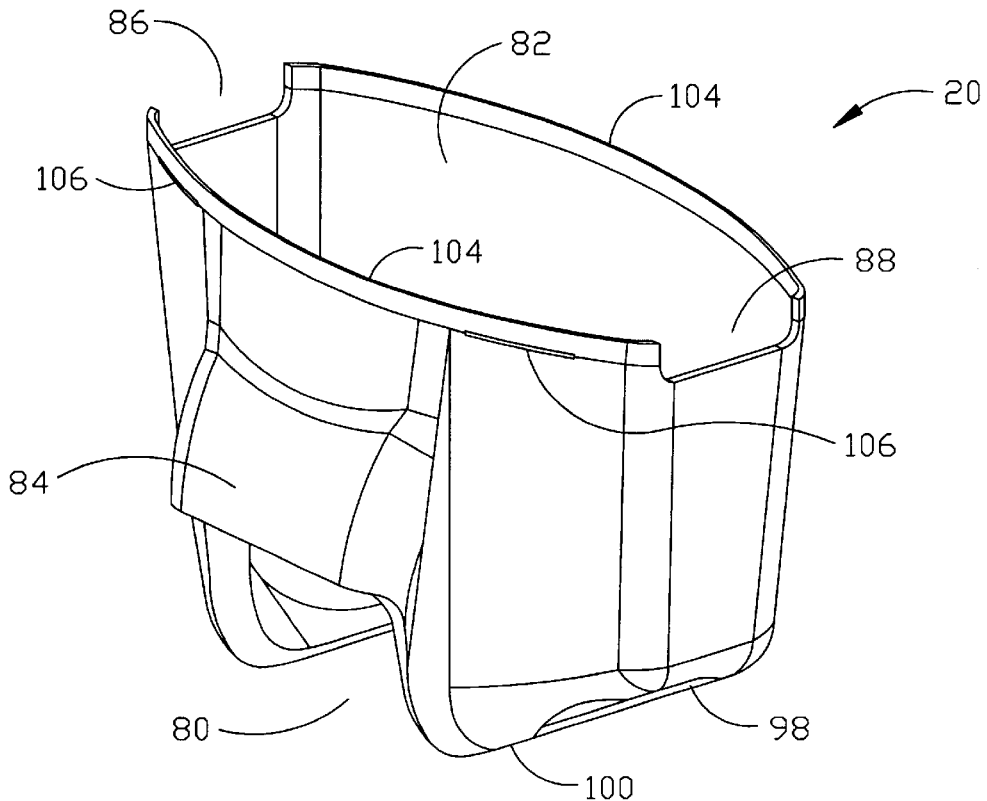
FIG. 5 is a pictorial view of a lower portion of the shroud of FIG. 1.
Figure 6:
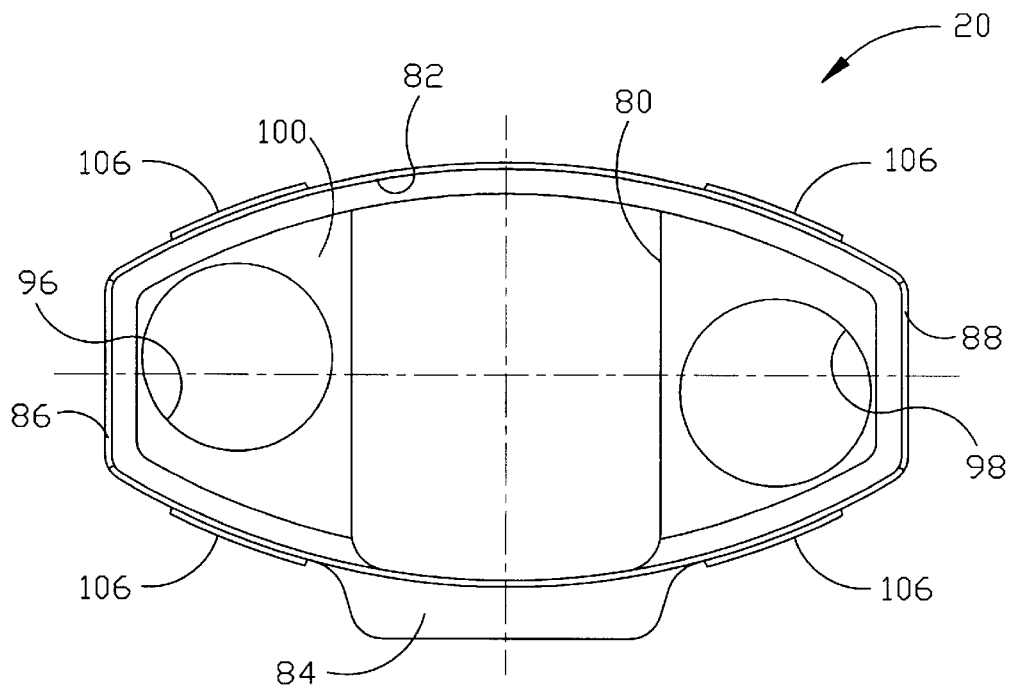
FIG. 6 is a top view of the lower portion of FIG. 5.

The lower portion 20 (FIGS. 5 and 6) of the upper shroud 18 is generally cup-shaped with a relatively smaller opening 80 which receives the portion 15 of the lower shroud 16 and the steering column 10. The lower portion 20 has a relatively larger opening 82 through which the steering column 10 extends. The opening 82 is covered by the shroud cap 22. The lower portion 20 of the upper shroud 18 includes a projecting portion 84 for permitting pivotal movement of the input shaft 12 relative to the steering column 10.

The lower portion 20 includes recesses 86 and 88 through which the turn signal actuator 24 or the air brake valve actuator 26 extend, depending on how the shroud cap 22 is positioned relative to the lower portion 20. A pair of openings 96 and 98 extend through a bottom 100 of the portion 20. Conduits connected to the air brake valve extend through either one of the openings 96 or 98 when the shroud is connected to the steering column 10.

Figure 7:
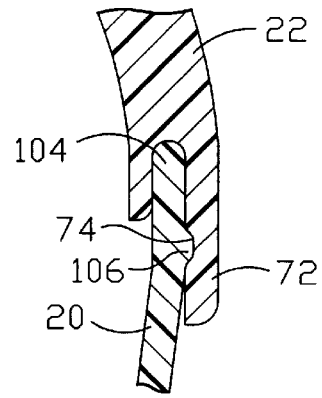
FIG. 7 is an enlarged sectional view of a part of the shroud of FIG. 1 showing how the shroud cap and the lower portion of the shroud are interconnected.
Figure 8:
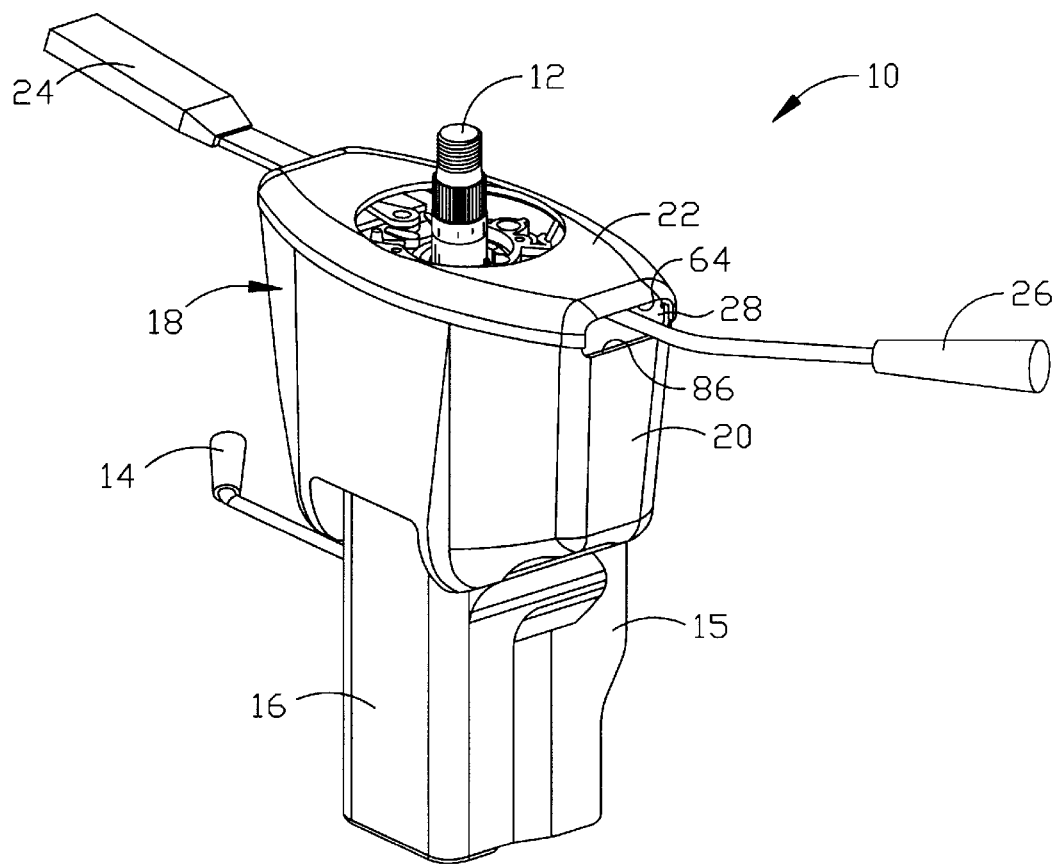
FIG. 8 is a pictorial view of a steering column with the shroud cap in a different position.

Upper lips 104 define the opening 82 and extend between the recesses 86 and 88. The lips 104 are received in the grooves 70 in the shroud cap 22, see FIG. 7. Projections 106 located on the lips 104 are received in the grooves 74 in the shroud cap 22 to fix the shroud cap 22 to the portion 20. Accordingly, the lower portion 20 and the shroud cap 22 snap together.

The steering column shown in FIG. 1 shows the shroud cap 22 in one position relative to the lower portion 20 of the upper shroud 18. The steering column is assembled to be mounted in a vehicle with the tilt and telescope locking mechanisms facing a driver of the vehicle. The turn signal actuator 24 is mounted on the steering column so that it is on the left hand side of the steering column. The recess 64 of the shroud cap 22 is adjacent the recess 86 of the lower portion 20 to define an opening through which the turn signal actuator 24 extends. The recess 62 of the shroud cap 22 is adjacent the recess 88 of the lower portion 20 to define the opening 28 through which the air brake valve actuator 26 extends.

The steering column shown in FIG. 2 is assembled to be mounted in a vehicle with the tilt and telescope locking mechanisms facing a dashboard in the vehicle. The shroud cap 22 is positioned 180° from the position shown in FIG. 1 relative to the lower portion 20. The recess 64 of the shroud cap 22 is adjacent the recess 88 of the lower portion 20 to define an opening through which the turn signal actuator 24 extends. The recess 62 of the shroud cap 22 is adjacent the recess 86 of the lower portion 20 to define the opening 28 through which the air brake valve actuator 26 extends. Accordingly, the same shroud can be used on a steering column that may be mounted in a vehicle in a number of different positions.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a shroud for surrounding an upper end of a vehicle steering column, said shroud including first and second portions;
   said first portion defining a first opening through which the steering column extends;
   said second portion at least in part defining a second opening through which a turn signal actuator mounted on the steering column extends, said second portion having means for enabling said second portion to be mounted in different positions relative to said first portion depending upon the position of the turn signal actuator relative to the steering column, said second portion at least partially closing said first opening defined by said first portion when said second portion is in said different positions, said second portion having a third opening through which the steering column extends.

2. An apparatus as set forth in claim 1 wherein said different positions of said second portion are offset 180° from each other.

3. An apparatus as set forth in claim 1 wherein said second portion includes a first recess defining a portion of said second opening, said first portion including second and third recesses, one of said second and third recesses being adjacent to said first recess to define said second opening depending on the position of said second portion.

4. An apparatus as set forth in claim 1 further including fasteners for connecting said second portion to the steering column, said fasteners also connecting the turn signal actuator to the steering column.

5. An apparatus as set forth in claim 1 wherein said second portion at least in part defines a fourth opening through which an actuator portion of an air brake valve mounted on the steering column extends.

6. An apparatus as set forth in claim 5 wherein said second portion includes a first recess defining a portion of said second opening and a second recess defining a portion of said fourth opening, said first portion including third and fourth recesses, one of said third and fourth recesses being adjacent to said first recess to define said second opening and the other of said third and fourth recesses being adjacent said second recess to define said fourth opening depending on the position of said second portion.

7. An apparatus as set forth in claim 5 further including fasteners for connecting said second portion to the steering column, said fasteners also connecting the air brake valve to said steering column and the turn signal actuator to the steering column.

8. An apparatus as set forth in claim 5 wherein said first portion defines fifth and sixth openings through which conduits connected to the air brake valve are extendable.

9. An apparatus as set forth in claim 1 wherein one of said first and second portions includes surface means for defining a groove for receiving a lip of the other of said first and second portions to interconnect said first and second portions.

10. An apparatus as set forth in claim 9 wherein said surface means for defining said groove includes means for defining a recess for receiving a projection on said lip.

11. An apparatus as set forth in claim 10 wherein said second portion includes said surface means for defining said groove and said first portion includes said lip.

12. An apparatus comprising:
    a vehicle steering column;
    a vehicle turn signal actuator mounted on said steering column and having means for enabling said turn signal actuator to be mounted on said steering column in different positions; and
    a shroud surrounding an upper end of said steering column, said shroud including first and second portions;
    said first portion defining a first opening through which said steering column extends;
    said second portion at least in part defining a second opening through which said turn signal actuator extends, said second portion having means for enabling said second portion to be mounted in different positions relative to said first portion depending upon the position of said turn signal actuator relative to said steering column, said second portion at least partially closing said first opening defined by said first portion when said second portion is in said different positions, said second portion having a third opening through which said steering column extends.

13. An apparatus as set forth in claim 12 further including an air brake valve having means for mounting said air brake valve in different positions on said steering column, said second portion at least in part defining a fourth opening through which an actuator portion of said air brake valve extends.

14. An apparatus as set forth in claim 13 wherein said second portion includes a first recess defining a portion of said second opening and a second recess defining a portion of said fourth opening, said first portion having a third and fourth recesses, one of said third and fourth recesses being adjacent said first recess and defining a portion of said second opening and the other of said third and fourth recesses being adjacent said second recess and defining a portion of said fourth opening depending on the position of said second portion.

15. An apparatus as set forth in claim 13 further including fasteners for connecting said second portion to said steering column, said fasteners also connecting said air brake valve to said steering column and said turn signal actuator to said steering column.

16. An apparatus as set forth in claim 15 wherein said second portion includes surface means for defining a groove for receiving a lip of said first portion to interconnect said first and second portions.

17. An apparatus as set forth in claim 16 wherein said surface means for defining said groove includes means for defining a recess for receiving a projection on said lip.

18. An apparatus as set forth in claim 12 wherein said steering column includes an input shaft pivotable relative to said steering column, said shroud being pivotable with said input shaft relative to said steering column.

19. An apparatus as set forth in claim 12 wherein said different positions of said second portion are offset 180° from each other.

20. An apparatus as set forth in claim 12 further including fasteners for connecting said second portion to said steering column, said fasteners also connecting said turn signal actuator to said steering column.

* * * * *